H. L. PARRISH.
MOTOR VEHICLE DRIVE.
APPLICATION FILED FEB. 12, 1918.
1,305,928.
Patented June 3, 1919.
2 SHEETS—SHEET 2.
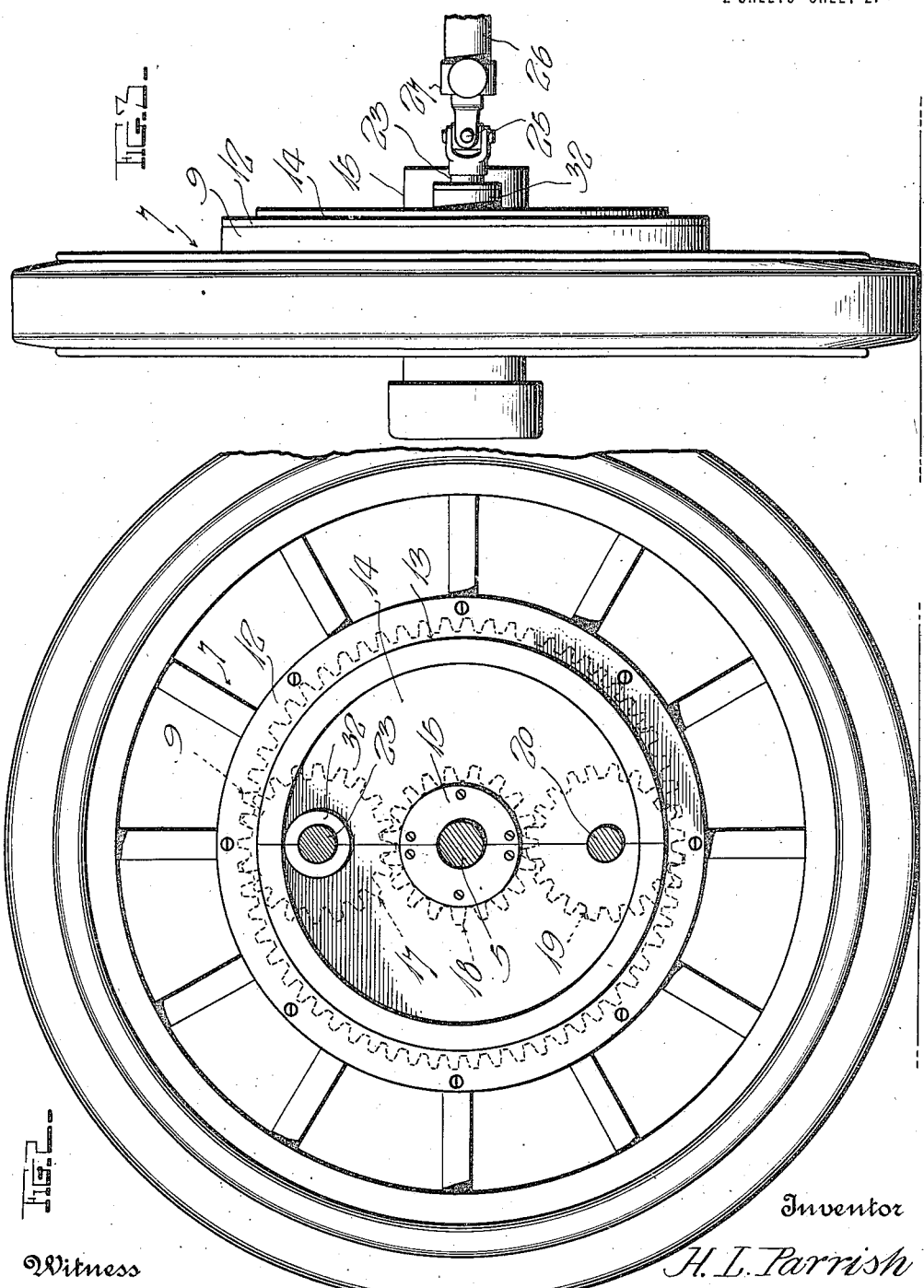

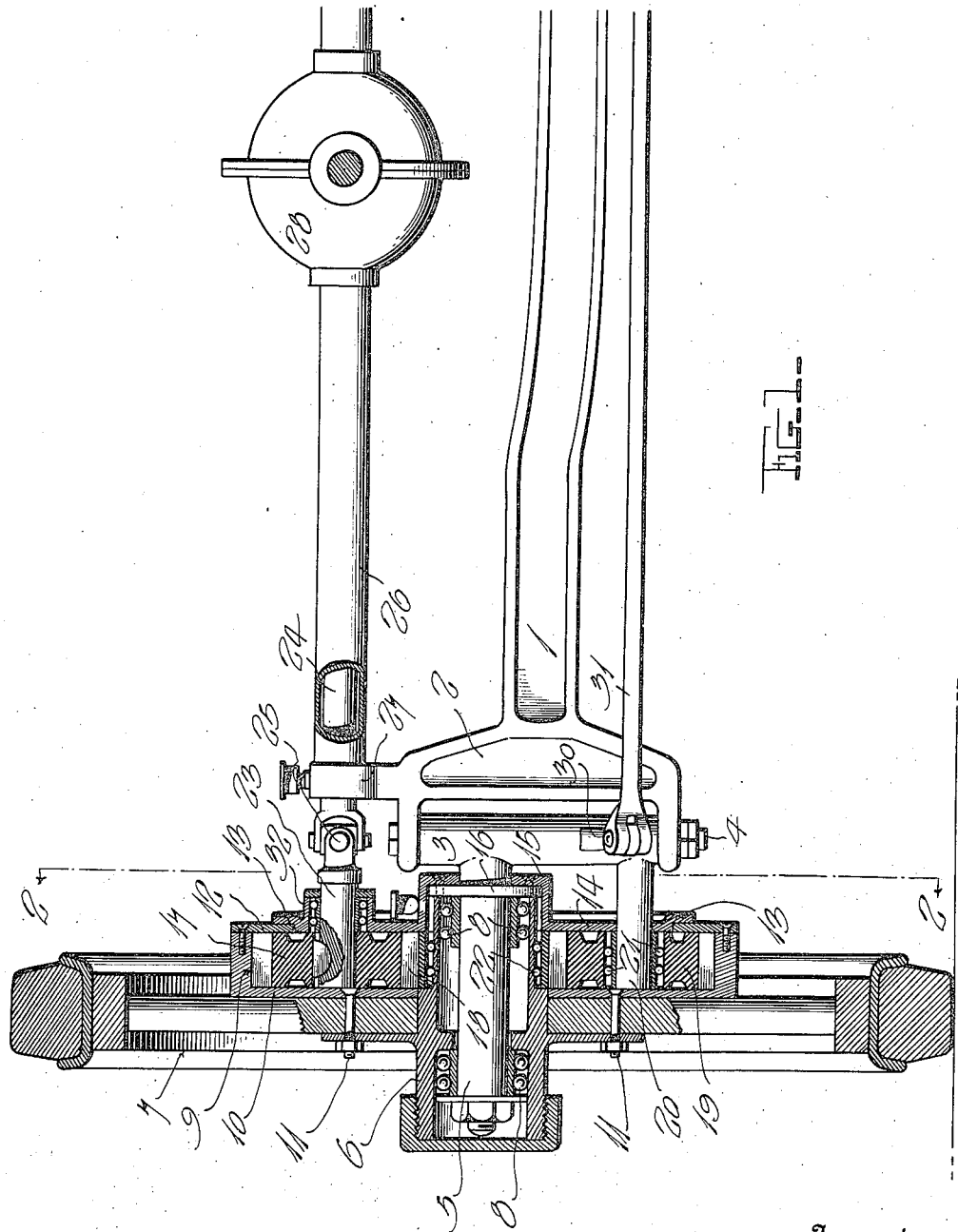

UNITED STATES PATENT OFFICE.

HERBERT L. PARRISH, OF OKLAHOMA, OKLAHOMA.

MOTOR-VEHICLE DRIVE.

1,305,928.  Specification of Letters Patent.  Patented June 3, 1919.

Application filed February 12, 1918. Serial No. 216,740.

*To all whom it may concern:*

Be it known that I, HERBERT L. PARRISH, a citizen of the United States, residing at Oklahoma city, in the county of Oklahoma and State of Oklahoma, have invented certain new and useful Improvements in Motor-Vehicle Drives; and I do declare the following to be a full, clear, and exact description of the invention, such as will enable others skilled in the art to which it appertains to make and use the same.

The principal object of my invention is to provide a simple and highly efficient drive for the wheels of motor vehicles which will permit steering thereof with ease, the improved construction being intended primarily for use upon the front wheels although it is equally adaptable for application to the rear wheels of machines having means for steering them.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a vertical sectional view through one wheel of an automobile, showing the adjacent parts in elevation and illustrating my improved features of construction;

Fig. 2 is a vertical section on the plane of the line 2—2 of Fig. 1; and

Fig. 3 is a top view of the wheel and adjacent parts.

In the drawings above briefly described, the numeral 1 designates an automobile axle having a forked knuckle 2 at its end, said knuckle receiving therein a steering knuckle 3 which is pivoted thereto by the usual king bolt 4. Near its upper end or at any other suitable location, the knuckle 3 carries a horizontal wheel spindle 5 upon which the hub 6 of one of the wheels 7 is rotatably mounted, ball or roller bearings 8 being employed between said hub and spindle as shown clearly in Fig. 1.

An internal gear 9 is carried by the wheel 7 and is by preference formed on the peripheral edge of a disk 10 secured to the inner side of the wheel by bolts or the like 11. A ring 12 is removably secured to the inner edge of the internal gear 9 and at 13 said ring slidably engages the peripheral edge of a circular two-part shield plate 14, said shield plate coacting with the ring 12 and with the plate 10 in forming a housing for the teeth of the internal gear 9 and for the several pinions yet to be described. The center of the plate 14 is preferably formed with a socket 15 receiving the inner end of the hub 6, and said center of the plate is suitably secured to a peripheral flange 16 formed on the inner end of the spindle 5.

A driving pinion 17 meshes with the internal gear 9 and with an idle pinion 18 which is mounted rotatably on the projecting inner end of the hub 6, said idle pinion meshing with a third pinion 19. Pinion 19 meshes with the internal gear 9 at a point preferably located diametrically opposite the driving pinion 17, and said pinion 19 is rotatable freely on a horizontal stub shaft 20 which projects laterally from the steering knuckle 3 through an opening in the shield plate 14. Ball bearings 21 are preferably interposed between the pinion 19 and the shaft 20, while others 22 are employed to insure easy rotation of the pinion 18. The driving pinion 17 is mounted on a drive shaft formed of inner and outer sections 23 and 24 connected by a universal joint 25 which is vertically alined with the king bolt 4. A suitable housing 26 for the drive shaft is secured at its end to lugs 27 rising from the knuckles 2, and said housing is provided with a differential casing 28 for the usual compensating gear which operates this drive shaft.

By the arrangement of parts above described, the wheel 7 will be driven from the drive shaft 24 and the drive will be transmitted to the internal gear 9 at diametrically opposite points, so that the strain upon the several parts is greatly reduced. Since the universal joint 25 is vertically alined with the king bolt 4, steering of the wheel by means of the usual steering arm 30 and rod 31, or by other preferred means, will not in any manner be obstructed by the driving means above described. However, in order to hold the shaft section 23 against possible canting either when steering or driving straight ahead, a rather long bearing 32 is preferably provided for said section, said bearing being carried by the shield plate 14.

The improved drive is comparatively simple and inexpensive, yet it will be observed that it will be highly efficient and durable. The invention may be applied to all four wheels of the machine if means are provided for steering all of said wheels, but in most cases I intend to use the invention upon the front wheels of motor vehicles for operation in conjunction with the usual driving means for the rear wheels. In all cases, the advantages of the four wheel drive will be derived without a great disadvantage which has heretofore existed, that is, interference with easy steering.

Since probably the best results are obtained from the several specific details shown and described, these details are preferably employed, but within the scope of the invention as claimed, numerous minor changes may well be made.

I claim:

1. In a motor vehicle drive, the combination with a fixed axle having a knuckle, a spindle having a steering knuckle pivoted to said first named knuckle, a wheel rotatable on said spindle and having an internal gear, an idle pinion at the center of the wheel and rotatable relatively to said wheel, a driving pinion meshing with said internal gear and with said idle pinion, a drive shaft carrying said driving pinion, a third pinion meshing with said internal gear and with said idle pinion, and a stub shaft upon which said third pinion is rotatably mounted, said stub shaft being rigidly carried on said steering knuckle.

2. A structure as specified in claim 1, together with a peripheral flange on the inner end of said spindle, a circular shield plate secured at its center to said flange and forming with other parts a housing for said gear and pinions, said plate having a bearing for said drive shaft and also having an opening for said stub shaft.

In testimony whereof I have hereunto set my hand in the presence of two subscribing witnesses.

HERBERT L. PARRISH.

Witnesses:
  A. G. PARRISH,
  GEO. E. CRINER.